United States Patent Office.

GEORGE A. LEINAU, OF PHILADELPHIA, PENNSYLVANIA.

Letters Patent No. 62,760, dated March 12, 1867.

IMPROVEMENT IN PREPARING FERTILIZERS.

The Schedule referred to in these Letters Patent and making part of the same.

TO ALL WHOM IT MAY CONCERN:

Be it known that I, GEORGE A. LEINAU, of the city and county of Philadelphia, and State of Pennsylvania, have invented a new and improved Fertilizer; and I do hereby declare the following is a full, clear, and exact description thereof.

The nature of my invention consists in a combination of grass or clover sod with chemical substances and other ingredients, in a particular manner, in certain proportions, and at proper intervals of time, to form a "fertilizer" to be applied to the soil.

To enable others skilled in the art to make and use my invention, I will proceed to describe the process and mode of manufacture.

I take grass or clover sod, and turn it over to the roots by the plough; then strew over it twenty-five tons of quick-lime to four hundred tons of sod. This must now be well worked by the spade, and heaped up three or four feet high. Then leave it for thirty days to rest, in which time the darkness occasioned by the banking up of the mass will cause a chemical change to take place; and in about sixty days from the time of turning the sod and applying the quick-lime, if it has been well worked and kept covered in banks, it will become a fine mould, the roots of the grass changing to nitrogen by being incorporated with the quick-lime. Then take thirty barrels of blood, mingled with thirty barrels of urine, and distribute it over the four hundred tons. Then take of domestic guano, from the hen or pigeon house, and having ground it fine, sprinkle it over the mass in the proportion of one ton to every hundred. Over the domestic guano spread land plaster, powdered, in the ratio of one barrel to every hundred tons, or four barrels to the four hundred tons. This will retain the ammonia in the domestic guano, for which it has an affinity. Add twenty-five wagon-loads of spent charcoal (which can be had at any distillery for a trifle) to the above mass of four hundred tons. This is to be well worked with the spade, and in sixty days it will be ready for use. Scatter this fertilizer over the land, and plough lightly or harrow it in. This fertilizer can be made at a cost of one dollar per ton for the materials used, and it has also this advantage, that every farmer can be his own manufacturer. The blood and urine might be omitted from the process, or the guano and plaster, and still make a good fertilizer, though it is better to have all in as specified. Of course I do not claim the mere application of quick-lime or the other ingredients to the soil, and then ploughed in, but only when banked up and mixed at intervals of time as described.

What I claim as my invention, and desire to secure by Letters Patent, is—

I claim the fertilizer, made by the process set forth, in which vegetable matter is banked up with quick-lime, and mixed with certain other named ingredients, at proper intervals of time, in the manner substantially as described.

GEO. A. LEINAU.

Witnesses:
STANLEY C. HYLTON,
EDWD. BROWN.